United States Patent Office 3,016,198
Patented Jan. 9, 1962

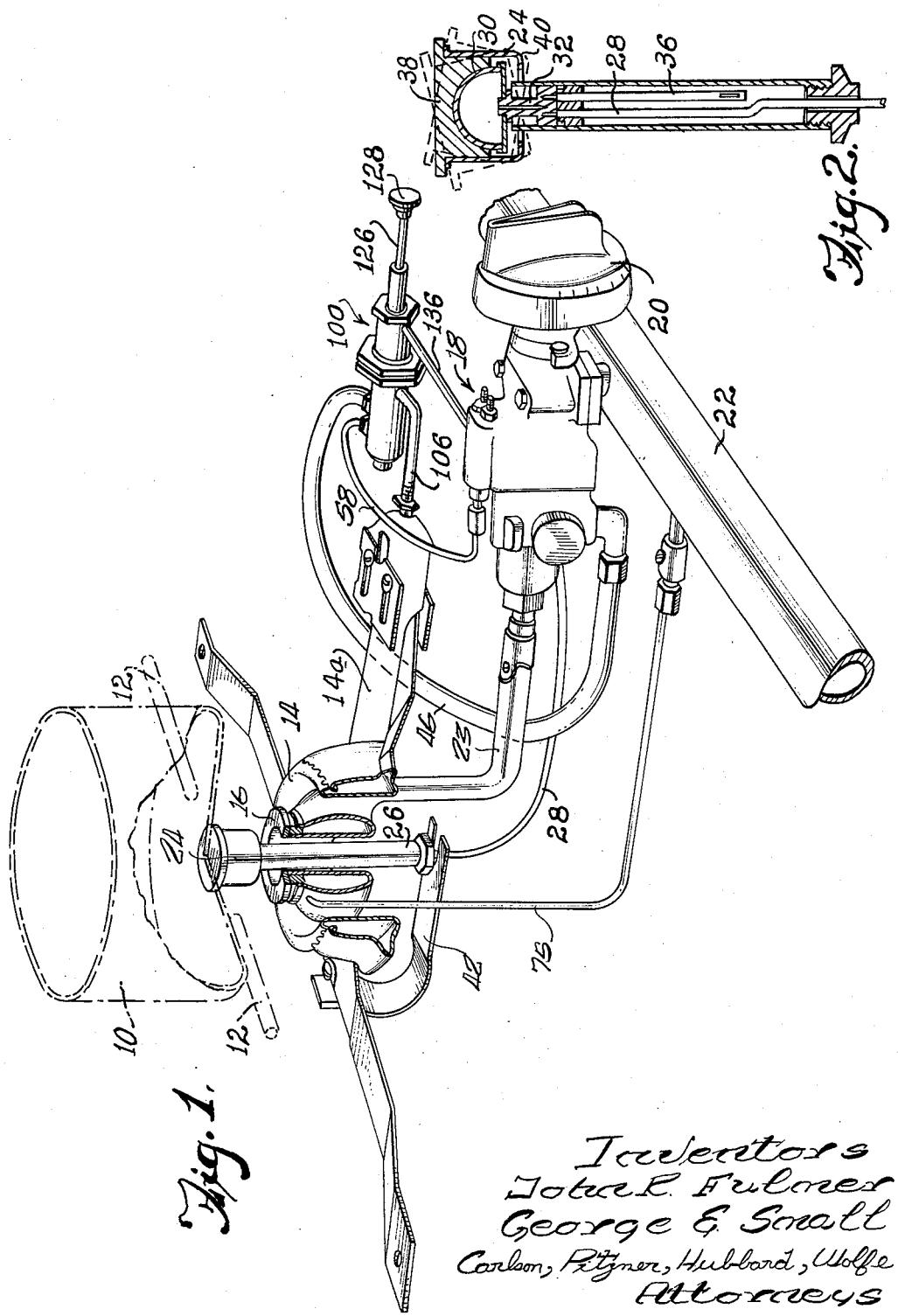

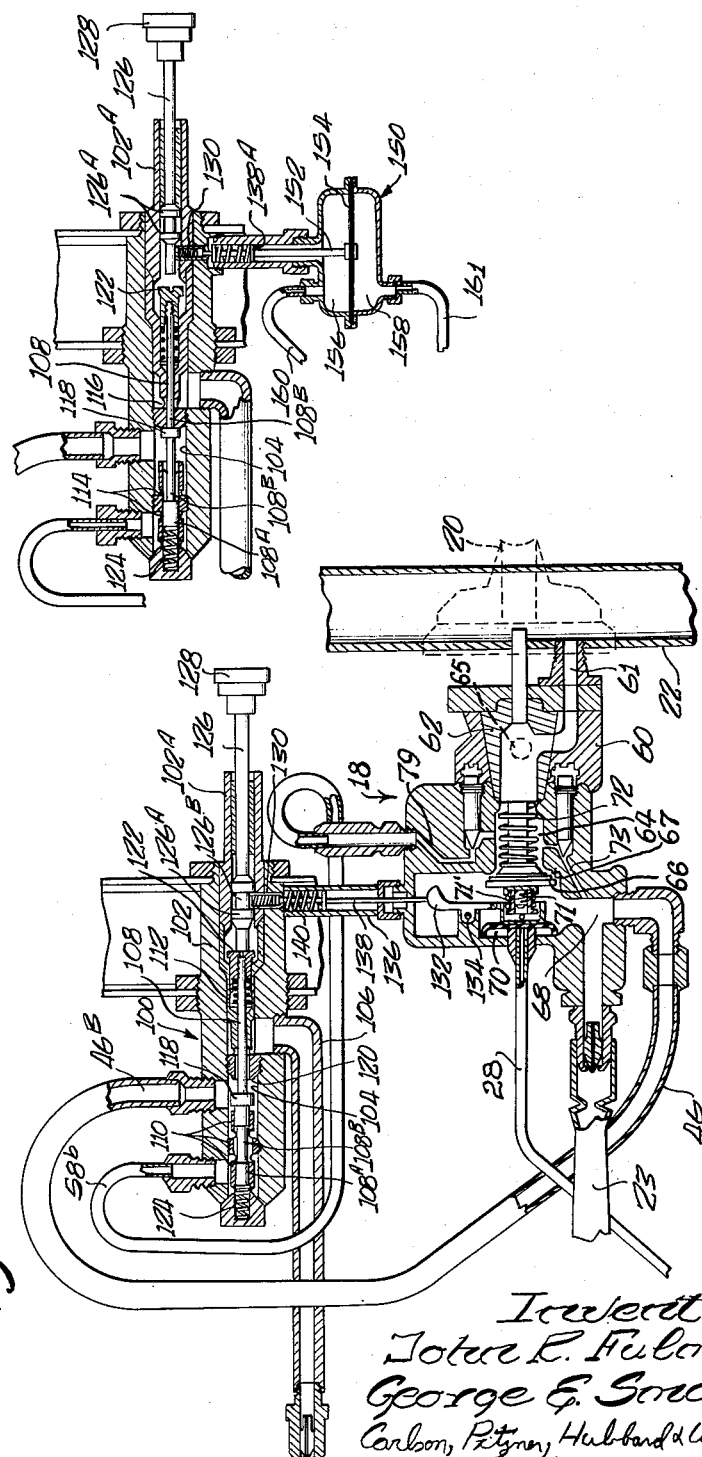

3,016,198
AUTOMATIC CONTROL FOR RANGE DOUBLE BURNER
George E. Small and John R. Fulmer, Kankakee, Ill., assignors to "Geo. D. Roper Corporation," a corporation of Massachusetts
Filed Feb. 29, 1956, Ser. No. 568,486
4 Claims. (Cl. 236—1)

The present invention relates to ranges and especially to automatic control means of the general type disclosed in co-pending application for U.S. patent Serial No. 464,257, filed October 25, 1954, now Patent No. 2,862,667. More particularly, the invention concerns means for controlling the temperature of a cooking utensil while heating the same with a double burner.

It is a primary object of the present invention to provide means for controlling the temperature of a cooking utensil over a relatively wide range of temperatures by utilizing a simple double burner arrangement. In this respect, the invention finds particular utility as employed in so-called "waterless" cooking wherein it is desirable to heat a utensil to cooking temperature as rapidly as possible and then to reduce the heat input until the flame is just sufficient to maintain a constant "waterless" cooking temperature, i.e., a temperature below the boiling point of water.

Accordingly, it is another object of the invention to provide an automatic control for use with a heating arrangement incorporating inner and outer concentric burners wherein a cooking utensil may be rapidly brought to the desired cooking temperature with the use of both burners, and once this temperature is attained, the outer burner may be shut off to permit the inner burner to maintain the desired temperature.

It is an allied object to provide a temperature control of the above type which is accurate and quickly responsive to changes in demand over a wide range of temperatures.

Yet another object of the invention is to provide temperature control means for a cooking utensil, which means includes a temperature sensing element maintained in intimate thermal contact with the utensil and arranged to cooperate with the double burner.

It is a further object of the invention to provide a temperature control which utilizes standard commercially available thermostatic valves and control elements and requires a minimum of maintenance and care.

Other objects and advantages of the invention will become apparent upon reading the attached detailed description and upon reference to the drawings, in which:

FIGURE 1 is a perspective, partly in section, of an illustrative double burner arrangement showing the control means employed in practicing the present invention.

FIG. 2 is an enlarged vertical section of the temperature sensing element employed in practicing the invention.

FIG. 3 is a fragmentary vertical section showing the operative relationship as between the elements of the control means shown in FIG. 1.

FIG. 4 is a fragmentary vertical section of the outer burner valve shown in FIG. 3 in the closed condition, showing another illustrative type operative connection between this valve and the thermostat control device.

While the invention is described in connection with certain preferred embodiments thereof, it will be understood that it is not intended to limit the invention to such embodiments but rather it is intended to cover all alternative embodiments and constructions falling within the spirit and scope of the appended claims.

Turning now to the drawings, a cooking utensil 10 is shown mounted on a conventional grate 12 of the range (FIG. 1). The utensil is heated by large and small concentric burners 14, 16, respectively. Gas is fed to the burners 14, 16 from a thermostat control device 18 having a manual control knob 20 and supplied from a gas supply line or header 22. The control device 18 is directly connected to the inner or small burner 16 by means of a suitable connecting tube 23.

Arranged centrally within the inner or small burner 16 and in contact with the underside of the utensil 10 is a thermostat head 24 supported on a vertical pedestal 26 and operative to control the automatic operation of the control device 18. A flexible metallic tubing 28 connects the thermostat head 24 to the thermostat control device 18.

Referring to the enlarged vertical section of the thermostat head 24 shown in FIG. 2, it will be noted that this member includes a hemispherical metal bulb 30 which is mounted on a stem 32. The temperature sensing bulb 30 and the tubing 28 are both filled with a suitable heat sensitive fluid, the thermal expansion of which operates the control device 18. Since the construction of the thermostat head is substantially the same as that shown in the above-mentioned co-pending application for patent, reference may be had to that application for details and it will suffice here to generally describe this element. Connected to the lower end of the stem 32 is the tube 28 leading to the thermostat control device, as well as a fill tube 36. Cooperating with the hemispherical bulb 30 is a contact cap 38 having a flat top surface and a concave under side which fits snugly over the bulb and is rockable thereon with a ball-and-socket action, as shown in phantom in FIG. 2. A cylindrical skirt 40 is telescoped over the body of the contact cap 38 for thermally shielding the bulb 30 from radiation and convection.

As seen from FIG. 1, the thermostat head 24 is upwardly biased into contact with the underside of the utensil 10 so that the upper surface of the cap 38 aligns itself flatly against the underside of the utensil and into intimate thermal contact therewith. In the present instance, the bias is provided by a C-spring 42, one end of which is connected to the frame of the range and the other end of which presses against the bottom end of the pedestal 26.

In this arrangement then, it is seen that direct heat transfer from the gas flame to the thermostat head 24 by convection currents is avoided. This is because the thermostat head is centered within the central opening in the inner burner 16 so that the secondary air which passes up through the middle of the burner follows an annular path and thus forms an isolating blanket around the thermostat head.

In carrying out the present invention, means including a control valve 100 is provided for controlling the temperature of the cooking utensil 10 over a relatively wide range of temperatures attained by utilizing the double burner arrangement 14, 16. Control valve 100 is seen to be remotely located with respect to the thermostat control device 18, the former being interposed between the large burner 14 and the control device, suitable connections being made therebetween through a large burner manifold 14a and a flexible tube 46, respectively. With such an arrangement, it is possible to employ both of the concentric burners 14, 16 in rapidly bringing the temperature of the utensil 10 to the desired point, and then by positively shutting off the control valve 100 it is possible to drastically reduce the quantity of heat applied to the utensil and to accurately control the cooking temperature using only the small burner for heating.

In this instance the control valve 100 is shown in open and closed positions in FIGS. 3 and 4, respectively, and comprises a generally barrel-shaped body 102 having an axial bore 104 passing therethrough. Gas inlet and outlet tubes 46b, 106 respectively, are provided on opposite sides of the bore 104 near one end of the body 102 and a bypass tube 58b also communicates between the thermostat device 18 and the control valve 100. An axially slidable, elongated valving element 108 is disposed within the bore for permitting gas flow through the valve, as will be described in greater detail below. As shown, the valving element 108 may be manually opened using the knob 128 which is mounted on the end of a plunger 126. It is preferable to employ a three-way type valve to permit use of a gas by-pass 58b which is connected between the control device 18 and the valve 100. The by-pass 58b functions as a safety device to by-pass a small predetermined amount of gas around the controlling element within the thermostat control device 18 so that there is always a minimum constant flow of gas to the burner when the control valve 100 is in the open position.

The thermostat control device 18 comprises a manually settable thermostatically controlled valve and is shown in section in FIG. 3. The device includes a body 60 having an inlet 61 and a ported valve member 62 rotatably seated in the body and coupled to the knob 20. The valve member 62 has an axial bore opening at one end into a middle valve chamber 64 and one or more ports 65 opening radially from the bore. These ports are movable into registration with the inlet 61 upon rotation of the valve member 62 to predetermined angular positions. Thus when the knob 20 is in its automatic control range, gas is admitted to the middle chamber 64, the outlet of which is under the control of a valve disc 66 adapted to cooperate with a valve seat 67. Gas flowing past the valve disc 66 and seat 67 passes into an outer valve chamber 68 connected with the burners 14, 16. Communication between the chambers 64 and 68 is thus controlled by the valve disc 66 which is movable between open and closed positions in accordance with the temperature to which the heat sensing bulb 30 (FIG. 2) is subjected. For this purpose, the tube 28 extending from the bulb 30 is connected to a bellows 70 arranged coaxially within the chamber 68 and coupled to the disc 66 by means including a centrally arranged adjusting screw 71 threaded into a tubular coupling element 71'. By turning the screw 71 through the control knob 20 the spacing of the valve disc 66 from the bellows 70 can be varied to determine the temperature at the bulb required to close the valve.

Opposing the pressure of the bellows 70 and arranged on the opposite side of the disc 66 is a coil spring 72 which normally urges the valve disc to open position. As the temperature of the bulb 30 increases, expansion of the fluid therein acts through the bellows 70 to shift the valve disc 66 toward the closed position.

Adjustment of the controls to select the temperature to be maintained in the utensil 10 is effected by varying the spacing of the valve disc 66 with reference to the bellows 70. This is done by turning the control knob 20 which is coupled to the adjusting screw 71. To facilitate selection of the predetermined "waterless" cooking temperature, a suitably graduated scale may be provided on the knob 20 or on the valve structure in concentric relation to the knob. It is thus seen that the control action is corrective so that the rate of gas flow past the disc 66 is varied automatically to maintain the temperature of the bulb 30 at a set value. A conventional adjustable port 73 is provided in the valve body 60 for by-passing a small quantity of gas from the middle valve chamber 64 around the control disc 66 to prevent the flame from going out as a result of "turndown." A second port 79 is also provided in the valve body 60 for connection with the by-pass 58b associated with the control valve 100.

Because of the intimate thermal contact between the relatively massive cooking utensil 10 and the thermostat head 24, control of the utensil temperature is precise and correction is rapidly made so as to prevent overshoot or undershoot when the load in the utensil is varied. Thus, the flame is rapidly reduced between batches to prevent overheating and is increased to a high value when a fresh batch is applied, all without care or attention on the part of the operator.

In keeping with the present invention, the control valve 100 shown in FIG. 3 and 5 is manually opened and automatically closed when gas flow through the thermostat control device 18 is reduced to a predetermined value. To this end, the valving element 10 is slidably supported in a pair of axially aligned sleeves 110, 112 fitted within the bore 104, the sleeves being provided with ports 114, 116, respectively, for permitting gas flow through the valve. In turn the element 108 is provided with alternately spaced lands 108A and portions of reduced cross section 108B for cooperating with the ported sleeves 114, 116 to open or close the valve when the element 108 is shifted to the left or right, respectively, as viewed in FIGS. 3 and 4. Additionally, a shoulder 118 is provided on the valving element 108 for abutment when the valve closes a valve seat 120 formed on the inner end of the sleeve 112. The valving element 108 is formed at its outer end with a cap 122 and terminates within the valve body 102 and the sleeve 112.

Normally the valving element 108 is biased into a closed position by means of a helical compression spring 124 interposed in the bore 104 between the left end as viewed in the drawings of the valve body 102 and the corresponding end of the element 108. For shifting the element 108 to the open position, the plunger 126 is disposed within an extension 102A of the valve body and in axially aligned relation with the valving element cap 122. As will be seen the plunger 126 carries an outer operating knob 128 by means of which it may be manually shifted axially from right to left. When this is done the inner end of the plunger 126 abuts the valve element cap 122; further motion of the plunger forces the element 108 against the bias of the spring 124 and into an open position as shown in FIG. 3. In this position gas flows from the tubes 46b, 58b through the ports 114, 116 and past the valve seat 120 into the outlet tube 106 leading to the large burner 14.

Automatic closing of the control valve 100 shown in FIG. 3 is effected upon the attainment of a predetermined throttling position of the disc 66 with respect to the valve seat 67 in the thermostat control device 18. This is done by providing a retractable stop 130 engageable with the plunger 126 of the control valve 100 and operatively connected with the valving disc 66 of the thermostat device 18. Thus, the thermostat valve body 60 includes a cam lever 132 pivoted therein at 134 and adaptable to swingably follow the in-and-out motion of the thermostat disc 66 as that disc throttles the gas flow, as described above. Extending between the thermostat body 60 and the control valve body 102 is a sleeve 136 in which is disposed a follower rod 138, one end of which axially contacts the lever 132 and the other end of which carries the stop 130. A helical compression spring 140 interposed in the sleeve 136 between the valve body 102 and a disc 138A carried by the rod 138 serves to normally bias the rod against the cam lever 132 and away from the plunger 126.

For receiving the stop 130, the control valve plunger 126 has a pair of axially spaced shoulders 126A thereon which define therebetween a groove 126B. When the plunger 126 is moved axially to open the valve 100, the groove 126B becomes aligned with the stationary stop 130 and in this position the stop snaps into place in the groove under the urging of the cam lever 132, which latter acts against the compression spring 140 when the gas is initially turned on. The control valve 100 thus remains in an open position until the thermostat disc 66 moves axially a predetermined distance toward a closed position of that valve. Upon attainment of this predetermined almost closed condition of the thermostat device 18, the cam lever 132 has swung enough to permit disengagement of the stop 130 from the groove 126B under the normal urge of the spring 140. The result is that the restraint is released from the control valve plunger 126 so that this plunger and the valving element 108 are forced to the right as viewed in the drawings under compulsion of the spring 124 and the control valve 100 is snapped into a closed condition. The valve 100 will not be again opened until the plunger 126 is manually shifted to once again lock the stop 130 within the plunger groove 126B.

In this way, no care or attention to the automatic burner control is required by the operator after the thermostat device 18 is once set to the desired cooking temperature and the control valve 100 is opened. The control valve 100 automatically snaps shut when the utensil 10 and foodstuffs cooking therein have reached the desired "waterless" cooking temperature, shifting the entire temperature control to the small inner burner 16.

The control valve arrangement shown in FIG. 4 is similar to that of FIG. 3 except that the operative connection between the stop 130 and the thermostat control device 18 is effected by a pressure differential device 150. Thus, as shown, a stop rod 152 is connected at one end to the stop 130 and at its other end to a diaphragm 154 centrally mounted in the device 150. Pressure chambers 156 and 158 formed in the device 150 on either side of the diaphragm 154 are connected through suitable tubes 160, 161 with relatively high and relatively low pressure points, respectively, in the thermostat control device (not shown). Thus one of the tubes 160 is connected with the middle chamber 64 of the thermostat which is normally under relatively high pressure, and the other tube 161 is connected with the outer valve chamber 68 which is normally under relatively low pressure.

When the valve plunger 126 illustrated in FIG. 4 is manually shifted to open the valve, the stop 130 snaps into locking engagement with the plunger and holds the valve open. At this time the utensil 10 is relatively cold so that the thermostat device 18 is wide open. Under these conditions the pressure differential across the thermostat disc 66 and between the chambers 64 and 68 is very slight and the diaphragm 154 exerts little force on the stop rod 152. When the thermostat device 18 is almost closed due to the attainment of the desired cooking temperature within the utensil 10, the pressure difference between the thermostat chambers 64, 68 becomes appreciable and the resulting unbalanced force against the diaphram 154 shifts the stop 130 so as to disengage it from the plunger 126. The control valve thus snaps closed.

Operation of the automatic control arrangement may be carried out as follows. With the cooking utensil 10 containing a foodstuff to be "waterless" cooked in position on the burner grate 12, the housewife manually opens the control valve 100 using the knob 128 and then sets the thermostat control knob 20 to the desired cooking temperature. Since the thermostat head 24 is relatively cold, the thermostat disc 66 will move into a wide open position thereby permitting gas to flow from the middle valve chamber 64 into the outer chamber 68 and thence through the flexible tube 46 leading to the valve 100 as well as through the connecting tube 23 which feeds the small burner 16. Since the control valve 100 is in the open position (as shown in FIG. 3) the gas entering through the tube 46B passes through this valve and into the large burner 14 by means of the manifold 14a. Both burners are lighted by a continuously burning pilot 75 (FIG. 1) and the initially relatively cold condition of the thermostat head 24 causes the control device 18 to remain open to the maximum degree commensurate with the temperature setting selected so that both burners 14, 16 are maintained at a condition of maximum heat output. As the utensil 10 is brought from room temperature up to the cooking temperature, both of the concentric burners 14, 16 play against the bottom of the utensil and the thermostat disc 66 gradually closes this valve in response to the thermal expansion of the heat sensitive fluid held in the bulb 30. In this way, the utensil is brought rapidly to the desired cooking temperature through the use of both inner and outer concentric burners 14, 16. As the utensil temperature rises, the thermostat head 24 causes the control device 18 to cut back on the gas feed to both outer and inner burners.

When the utensil 10 and the foodstuffs therein have attained the cooking temperature which has been set on the thermostat device 18, the thermostat device is in almost a closed condition. The cam lever 132 has swung a sufficient amount to permit disengagement of the stop 130 from the groove 126B, thus allowing the plunger 126 and valving element 108, to be forced to the right as viewed in the drawings under the force of the spring 124, and effecting automatic closing of the valve 100. When the control valve 100 is shut off, the small inner burner 16 will of course be suddenly furnished with the gas flow which had formerly been passing through the valve 100, and the flame on the small burner will be seen to increase to a sufficient degree to maintain the foodstuff temperature.

At this time the "waterless" cooking temperature has been attained and this temperature is maintained using only the small inner gas burner 16. It has been found in practice that the heat output of the small burner 16 can be reduced to as low as 300 B.t.u. per hour and somewhat less. On the other hand, with both large and small burners 14, 16 operating the initial heating of the relatively cold utensil 10 to the desired cooking temperature, it has been found that an unusually large heat output in the order of 15,000 B.t.u. per hour may be obtained.

Although certain preferred forms of operators for the control valve have been disclosed herein, it will be understood that alternative forms thereof may also be employed. For example, the control valves illustrated may be automatically opened as well as closed by a suitable timing device, or through a cam or equivalent mechanism connected between the control valve element and the thermostat knob 20 and effective to open the control valve at a certain predetermined temperature setting on the thermostat.

One of the advantageous features of the invention is that it is possible to obtain thermostatic control over an extremely wide range of burner outputs with a simple arrangement of valves and burners. Thus the use of the concentric burner arrangement disclosed permits attainment of the very low heat outputs required for warming small quantities of foodstuffs, such as soups, as well as the high outputs necessary for cooking large quantities of foods in large vessels. Furthermore, the arrangement permits independent manual adjustment of inside and outside burner outputs, if desired, to meet special requirements of certain cooking operations, as for example, coffee making.

We claim as our invention:

1. In a range, the combination comprising a support for a heat-conducting utensil, inner and outer circular gas burners arranged concentrically below the support for heating a utensil, said inner burner having a relatively low heat capacity and said outer burner a relatively high heat capacity, a single settable thermostat control device connected to a source of gas and arranged for feeding said burners, said thermostat control device including throttling means for gradually varying the gas feed to said burners, a temperature sensing element connected to the thermostat control device for positioning said throttling means, said temperature sensing element being mounted in a centered position above said burners and having its uppermost surface approximately co-planar with the top surface of said support so that said uppermost surface of the sensing element presses intimately against the underside of a utensil, an on-off valve connected between said thermostat control device and said outer burner, means for feeding gas from said thermostat control device through said on-off valve and thence into said outer burner, manually operable means for opening said on-off valve when heating of a utensil is initiated, and means interposed between and mechanically connected between said on-off valve and said thermostat control device and responsive to the attainment of a predetermined opening of said throttling means for positively shutting off the on-off valve whereby all of the gas for heating a utensil is fed to said inner burner.

2. In a range, the combination comprising a support for a heat-conducting utensil, inner and outer circular gas burners arranged concentrically below the support for heating a utensil, said inner burner having a relatively low heat capacity and said outer burner a relatively high heat capacity, a single settable thermostat control device connected to a source of gas and arranged for feeding said burners, said thermostat control device including throttling means for gradually varying the gas feed to said burners, a temperature sensing element connected to the theromstat control device for positioning said throttling means, said temperature sensing element being mounted above said burners and having its uppermost surface approximately co-planar with the top surface of said support so that said uppermost surface of the sensing element presses intimately against a utensil, and means responsive to the attainment of a predetermined position of said throttling means for shutting off said outer burner when only the low heat capacity of the inner burner is desired, said last-mentioned means including a valve controlling gas feed to the outer burner and mechanical connecting means between said valve and said thermostat control device.

3. In a range, the combination comprising a support for a heat-conducting utensil, inner and outer circular gas burners arranged concentrically below the support for heating a utensil, said inner burner having a relatively low heat capacity and said outer burner a relatively high heat capacity, a single settable thermostat control device connected to a source of gas and arranged for feeding said burners, said thermostat control device including a valve seat therein and a throttling disc movable with respect to the seat, a temperature sensing element connected to the thermostat control device for positioning said throttling disc, a normally closed valve connected between said thermostat control device and said outer burner, manually operable means for opening said valve when heating of a utensil is initiated, releasable locking means associated with said manual valve opening means and operable upon opening of said valve to hold the valve in open condition, and means responsive to the attainment of a predetermined opening of said thermostat throttling disc with respect to its valve seat for shutting off the gas to said outer burner, said means including a cam element connected to said thermostat disc for movement in accordance with throttling movement of the disc, and a cam follower element connected to said releasable locking means for releasing the same to thereby close the valve when the thermostat disc has attained the predetermined position indicating that a utensil has attained cooking temperature.

4. In a range, the combination comprising a support for a heat-conducting utensil, inner and outer circular gas burners arranged concentrically below the support for heating a utensil, said inner burner having a relatively low heat capacity and said outer burner a relatively high heat capacity, a single settable thermostat control device connected to a source of gas and arranged for feeding said burners, said thermostat control device including a valve seat therein and a throttling disc movable with respect to the seat, a temperature sensing element connected to the thermostat control device for positioning said throttling disc, and having its uppermost surface approximately co-planar with the top surface of said support, a normally closed valve connected between said thermostat control device and said outer burner, manually operable means for opening said valve when heating of a utensil in initiated, releasable locking means associated with said manual valve opening means and operable upon opening of said valve to hold the valve in open condition, and means responsive to the attainment of a predetermined opening of said thermostat throttling disc with respect to its valve seat for shutting off the gas to said outer burner, said means including a differential pressure device connected across the thermostat throttling disc, and a stop element connected between the differential pressure device and said releasable locking means and urged by the differential pressure device to release said locking means to thereby close the valve when the thermostat disc has attained the predetermined position indicating that a utensil has attained cooking temperature.

References Cited in the file of this patent
UNITED STATES PATENTS

| | | |
|---|---|---|
| 492,041 | Mitchell | Feb. 21, 1893 |
| 947,914 | Junkers | Feb. 1, 1910 |
| 1,201,469 | James | Oct. 17, 1916 |
| 1,421,692 | Hutchins | July 4, 1922 |
| 1,918,265 | Hartwig | July 18, 1933 |
| 2,121,977 | Newell | June 28, 1938 |
| 2,308,555 | Tate | Jan. 19, 1943 |
| 2,456,864 | Cole | Dec. 21, 1948 |
| 2,505,455 | Andersson | Apr. 25, 1950 |
| 2,509,679 | Evans | May 30, 1950 |
| 2,781,779 | Kindle | Feb. 19, 1957 |
| 2,828,919 | Hillebrand | Apr. 1, 1958 |
| 2,862,667 | Hillebrand | Dec. 2, 1958 |